United States Patent
Fong et al.

(10) Patent No.: US 7,054,084 B2
(45) Date of Patent: May 30, 2006

(54) METHOD, APPARATUS AND PROGRAM STORAGE DEVICE FOR SENSING INCREASED RESISTANCE CHANGES IN AN MR ELEMENT TO DETECT MR SENSOR EVENTS

(75) Inventors: Walton Fong, San Jose, CA (US); Remmelt Pit, Cupertino, CA (US); Mike Suk, San Jose, CA (US)

(73) Assignee: Hitachi Global Storage Technologies Netherlands B.V. (NL)

( * ) Notice: Subject to any disclaimer, the term of this patent is extended or adjusted under 35 U.S.C. 154(b) by 64 days.

(21) Appl. No.: 10/652,727

(22) Filed: Aug. 29, 2003

(65) Prior Publication Data

US 2005/0046983 A1    Mar. 3, 2005

(51) Int. Cl.
*G11B 27/36* (2006.01)
*G11B 21/02* (2006.01)

(52) U.S. Cl. .......................................... 360/31; 360/75
(58) Field of Classification Search ................. 360/25, 360/31
See application file for complete search history.

(56) References Cited

U.S. PATENT DOCUMENTS

| 6,452,735 B1* | 9/2002 | Egan et al. ............... 360/31 |
| 2002/0114092 A1* | 8/2002 | Yang ............................ 360/31 |
| 2004/0085670 A1* | 5/2004 | Li et al. ...................... 360/75 |

* cited by examiner

*Primary Examiner*—David Hudspeth
*Assistant Examiner*—Daniell L. Negrón
(74) *Attorney, Agent, or Firm*—Chamblies, Bahmer & Stophel, P.C.; David W. Lynch (57) ABSTRACT

A method, apparatus and program storage device for sensing increased resistance changes in an MR element to detect MR sensor events. The initial MR resistance for each slider is recorded during the drive build. The MR resistance is periodically monitored at later stages of the drive build and during normal operation. The later MR sensor resistance measurements are compared to the baseline measurement taken during the drive build to determine if an MR sensor event occurs, such as contact being made between the MR sensor and the recording medium or an MR sensor being positioned ON or OFF the ramp.

25 Claims, 7 Drawing Sheets

METHOD, APPARATUS AND PROGRAM STORAGE DEVICE FOR SENSING INCREASED RESISTANCE CHANGES IN AN MR ELEMENT TO DETECT MR SENSOR EVENTS

BACKGROUND OF THE INVENTION

1. Field of the Invention

This invention relates in general to the operation of a magnetic storage device, and more particularly to method, apparatus and program storage device for sensing increased resistance changes in an MR element to detect MR sensor events.

2. Description of Related Art

The "Magnetoresistive (MR) effect was discovered in perfect-crystal samples exposed to very high magnetic fields. The effect was also recently discovered in sputtered metallic thin films consisting of magnetic layers a few nanometers thick separated by equally thin nonmagnetic layers (Giant Magnetoresistive elements, or "GMR"). A large decrease in the resistance of these films is observed when a magnetic field is applied. The cause of this effect is the spin dependence of electron scattering and the spin polarization of conduction electrons in ferromagnetic metals. With layers of the proper thickness, adjacent magnetic layers couple antiferromagnetically to each other with the magnetic moments of each magnetic layer aligned antiparallel to the adjacent magnetic layers.

Magnetoresistive (MR) heads are employed in magnetic disc drives to read data from the storage disc. More particularly, the MR head employs an MR element whose resistance changes with changes in the confronting magnetic field. As the disc rotates adjacent the read head, changing magnetic fields due to recorded data on the disc moving past the MR element induces changes in the resistance of the MR element. A fixed bias current is applied to the head to generate a voltage across the head representative of the data. The voltage changes with the resistance changes to provide signals representing the data.

There is a continuing need to increase the recording capacity, and hence the density of data recording, on discs. Consistent with this need, efforts have been directed to more narrow data tracks and smaller track spacing. As track widths become narrower and track spacing becomes smaller, the read heads also become narrower, so as not to extend over the space between the tracks that might cause errors due to simultaneous reading of two or more data tracks.

The MR sensor is also sensitive to temperature changes that occur due to friction during head/disk interaction. Thermal asperities caused by the MR head contacting the surface of the recording media causes the instantaneous temperature to rise. This rise in temperature causes the data signal to spike and may momentarily disrupt the recovery of data from the drive if not compensated for. The resistance of the MR sensor is proportional to this temperature change, which may be caused by MR sensor events.

The flying heights of MR heads continue to decrease in an effort to provide ever increasing areal densities. For example, current flying height targets are less than 7 nm. Thus, it is critical to determine if unintentional contact between the head and disk occurs to eliminate thermal asperities and, more importantly, to maintain long-term mechanical reliability of the head/disk interface. However, currently an accurate way for detecting contact between the MR head and the recording media is not available without incurring additional cost and complexity to provide some type of contact sensor.

In addition, seek loss occurs in disk drives when servo is lost and the voice coil motor (VCM) seeks uncontrollably between the inner-diameter (ID) and the outer-diameter (OD) crash stop-this uncontrollable seek may cause significant disk damage. A quick recovery of this erratic VCM motion is possible if a sensor can detect when the head stack is ON the load/unload ramp, therefore allowing a control algorithm to reset the VCM's position there before continuing normal operation.

It can be seen then that there is a need for a method, apparatus and program storage device for sensing increased resistance changes in MR element to detect MR sensor events.

SUMMARY OF THE INVENTION

To overcome the limitations in the prior art described above, and to overcome other limitations that will become apparent upon reading and understanding the present specification, the present invention discloses a method, apparatus and program storage device for sensing increased resistance changes in an MR element to detect MR sensor events.

The present invention solves the above-described problems by monitoring the MR resistance to provide feedback about head/disk contact and sensor location ON/OFF the load/unload ramp without additional parts or cost since the resistance of the MR sensor is proportional to temperature change.

A method in accordance with the principles of the present invention includes a taking an initial baseline resistance measurement of an MR element, making a subsequent resistance measurement of the MR element and determining whether contact is being made between the MR element and a recording surface based upon the initial and subsequent MR element resistance measurements.

In another embodiment of the present invention, a storage device signal processor for detecting contact of an MR sensor is provided. The storage device signal processor includes memory for storing data and a processor, coupled to the memory, for taking an initial baseline resistance measurement of an MR element, making a subsequent resistance measurement of the MR element and determining whether contact is being made between the MR element and a recording surface based upon the initial and subsequent MR element resistance measurements.

In another embodiment of the present invention, a storage device is provided. The storage device includes a magnetic recording medium for recording data thereon, a transducer having an MR element for reading data stored on the magnetic recording medium, a motor, coupled to the magnetic recording medium, for translating the magnetic recording medium, an actuator, coupled to the transducer, for translating the transducer relative to the magnetic recording medium and a storage device signal processor, coupled to the motor, transducer and actuator, for taking an initial baseline resistance measurement of the MR element, making a subsequent resistance measurement of the MR element and determining whether contact is being made between the MR element and the magnetic recording medium based upon the initial and subsequent MR element resistance measurements.

In another embodiment of the present invention, a program storage device readable by a computer is provided. The program storage device readable by a computer tangibly embodies one or more programs of instructions executable by the computer to perform a method for sensing contact of an MR sensor with a recording medium, the method including taking an initial baseline resistance measurement of an MR element, making a subsequent resistance measurement of the MR element and determining whether contact is being made between the MR element and a recording surface based upon the initial and subsequent MR element resistance measurements.

In another embodiment of the present invention, another storage device signal processor for detecting contact of an MR sensor is provided. This storage device signal processor includes means for storing data and means, coupled to the means for storing data, for taking an initial baseline resistance measurement of means for reading data, making a subsequent resistance measurement of the means for reading data and determining whether contact is being made between the means for reading data and a recording surface based upon the initial and subsequent resistance measurements.

In another embodiment of the present invention, another storage device is provided. This storage device includes means for recording data thereon, means for reading data stored on the magnetic recording medium, means, coupled to the means for recording data thereon, for translating the means for recording data thereon, means, coupled to the means for reading data, for translating the means for reading data relative to the means for recording data thereon and means, coupled to the means for reading data, for taking an initial baseline resistance measurement of the means for reading data, making a subsequent resistance measurement of the means for reading data and determining whether contact is being made between the means for reading data and the means for recording data thereon based upon the initial and subsequent resistance measurements.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the embodiments, reference is made to the accompanying drawings that form a part hereof, and in which is shown by way of illustration the specific embodiments in which the invention may be practiced. It is to be understood that other embodiments may be utilized because structural changes may be made without departing from the scope of the present invention.

The present invention provides a method, apparatus and program storage device for sensing increased resistance changes in an MR element to detect MR sensor events. The MR resistance is monitored to provide feedback about head/disk contact and/or sensor location ON/OFF the load/unload ramp without additional parts or cost since the resistance of the MR sensor is proportional to temperature change.

Figure 1:
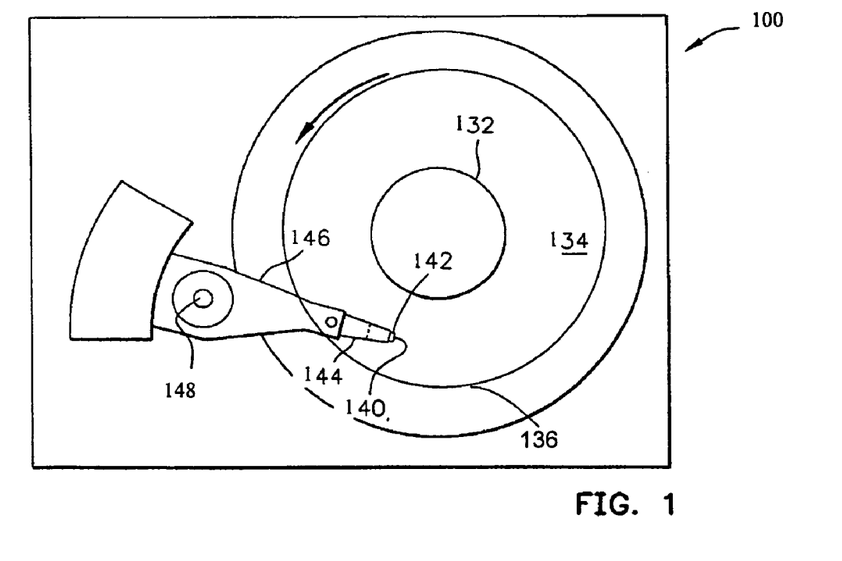
FIG. 1 illustrates a storage system according to the present invention.

FIG. 1 illustrates a storage system 100 according to the present invention. In FIG. 1, a transducer 140 is under control of an actuator 148. The actuator 148 controls the position of the transducer 140. The transducer 140 writes and reads data on magnetic media 134 having ramp 136, the magnetic media 134 rotated by a spindle 132. A transducer 140 is mounted on a slider 142 that is supported by a suspension 144 and actuator arm 146. The suspension 144 and actuator arm 146 positions the slider 142 so that the magnetic head 140 is in a transducing relationship with a surface of the magnetic disk 134.

Figure 2:
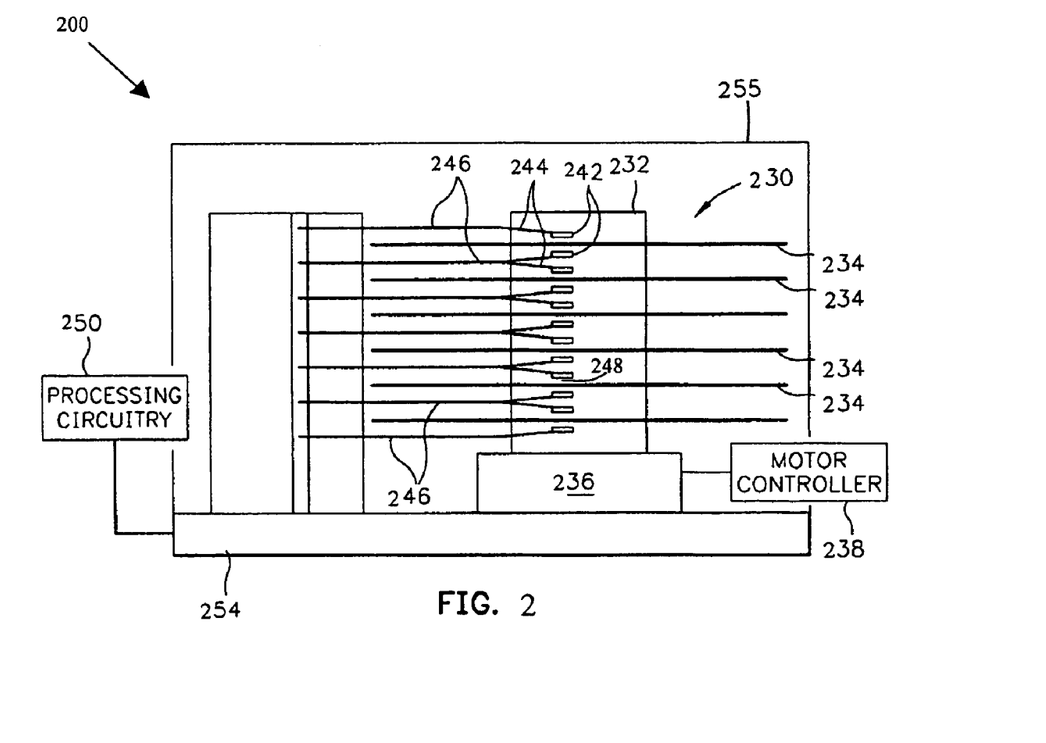
FIG. 2 illustrates one particular embodiment of a storage system according to the present invention.

FIG. 2 illustrates one particular embodiment of a storage system 200 according to the present invention. In FIG. 2, a hard disk drive 230 is shown. The drive 230 includes a spindle 232 that supports and rotates magnetic disks 234. A motor 236, mounted on a frame 254 in a housing 255, which is controlled by a motor controller 238, rotates the spindle 232. A combined read and write magnetic head is mounted on a slider 242 that is supported by a suspension 244 and actuator arm 246. Processing circuitry 250 exchanges signals, representing such information, with the head, provides motor drive signals for rotating the magnetic disks 234, and provides control signals for moving the slider to various tracks. The plurality of disks 234, sliders 242 and suspensions 244 may be employed in a large capacity direct access storage device (DASD).

When the motor 236 rotates the disks 234 the slider 242 is supported on a thin cushion of air (air bearing) between the surface of the disk 234 and the air-bearing surface (ABS) 248. The magnetic head may then be employed for writing information to multiple circular tracks on the surface of the disk 234, as well as for reading information therefrom.

Figure 3:
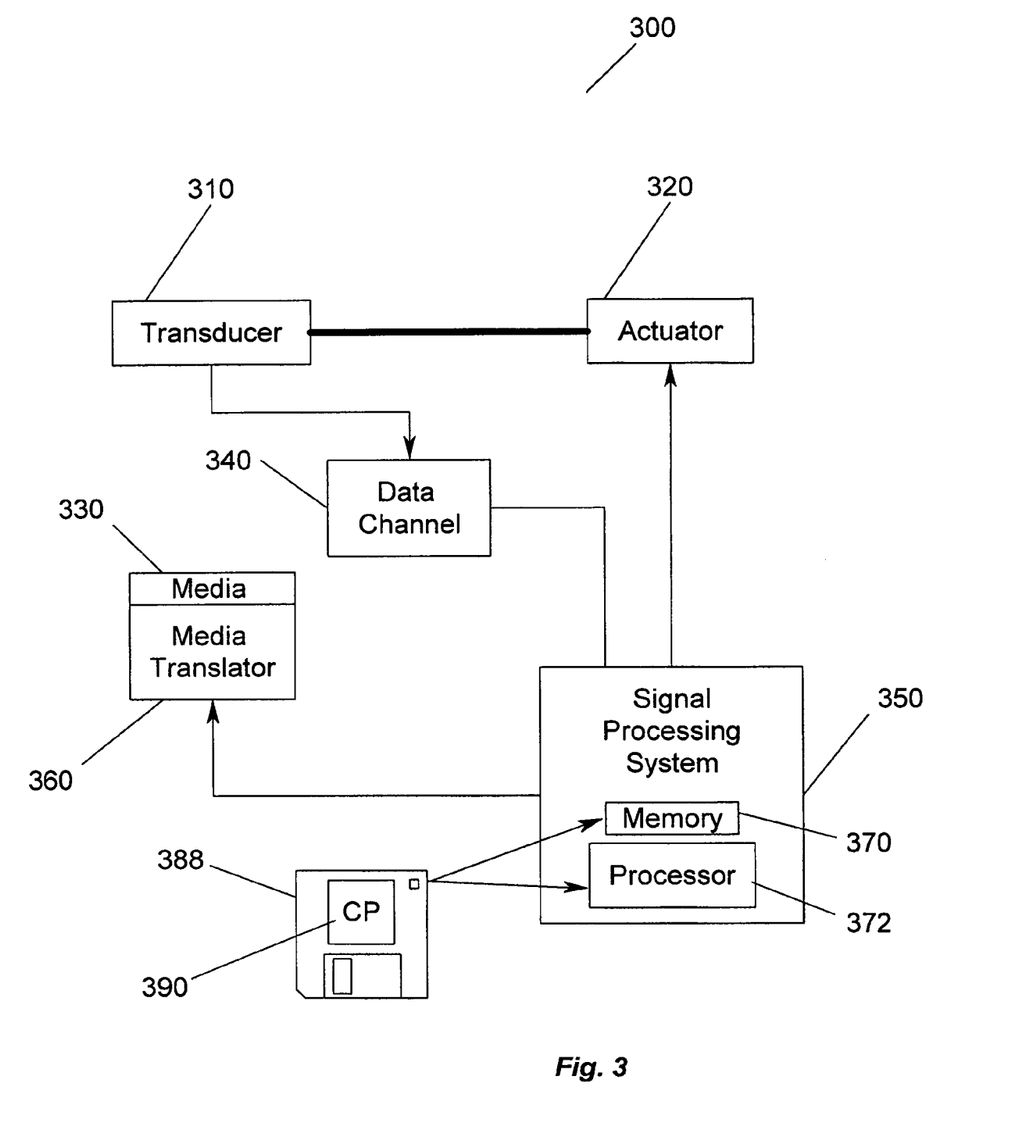
FIG. 3 illustrates a storage system according to the present invention.

FIG. 3 illustrates a storage system 300 that uses an MR sensor for sensing increased resistance changes in an MR element to detect MR sensor events according to an embodiment of the present invention. In FIG. 3, a transducer 310 is under control of an actuator 320. The actuator 320 controls the position of the transducer 310. The transducer 310 writes and reads data on magnetic media 330. The read/write signals are passed to a data channel 340. A signal processor system 350 controls the actuator 320 and processes the signals of the data channel 340. In addition, a media translator 360 is controlled by the signal processor system 350 to cause the magnetic media 330 to move relative to the transducer 310. Nevertheless, the present invention is not meant to be limited to a particular type of storage system 300 or to the type of media 330 used in the storage system 300.

Figure 4:
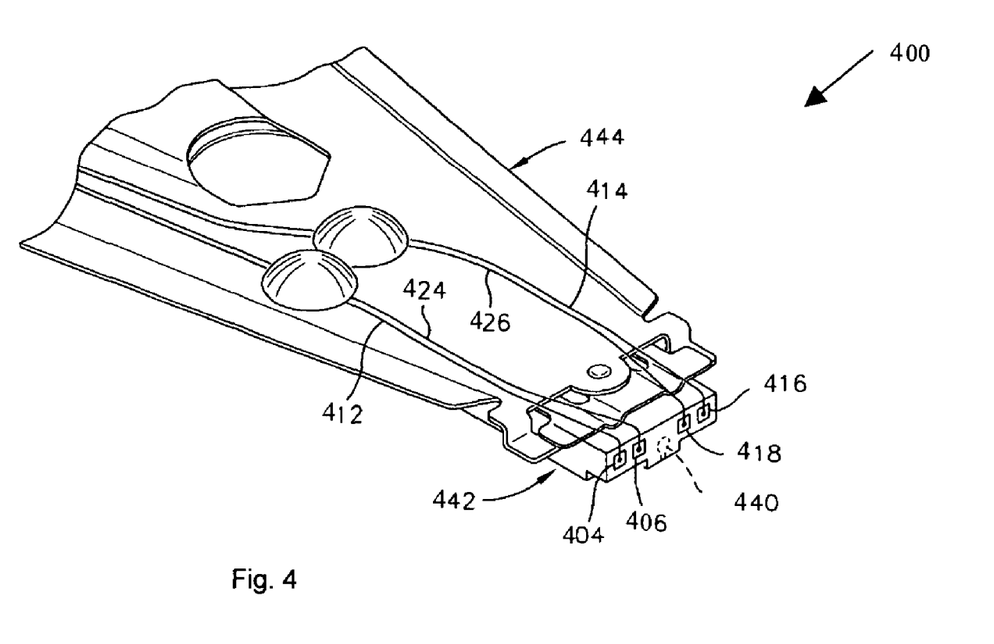
FIG. 4 is an isometric illustration of a suspension system for supporting a slider having a magnetic head mounted thereto.

FIG. 4 is an isometric illustration of a suspension system 400 for supporting a slider 442 having a magnetic head mounted thereto. In FIG. 4 first and second solder connections 404 and 406 connect leads from the sensor 440 to leads 412 and 424 on the suspension 444 and third and fourth solder connections 416 and 418 connect the coil to leads 414 and 426 on the suspension 444. However, the particular locations of connections may vary depending on head design.

Figure 5:
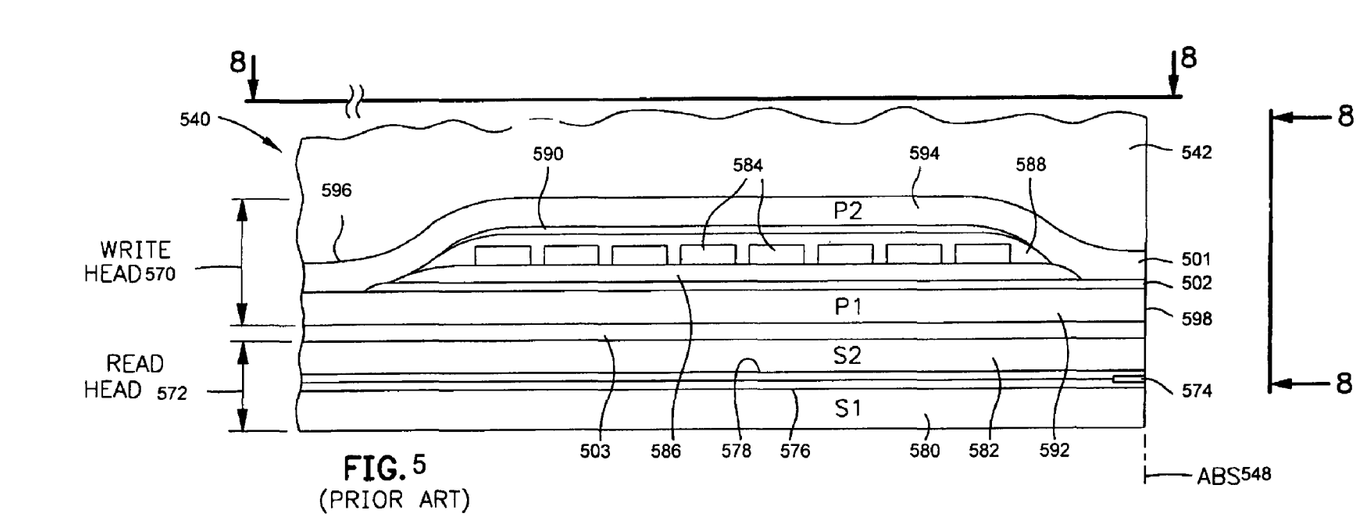
FIG. 5 is a side cross-sectional elevation view of a magnetic head.
Figure 6:
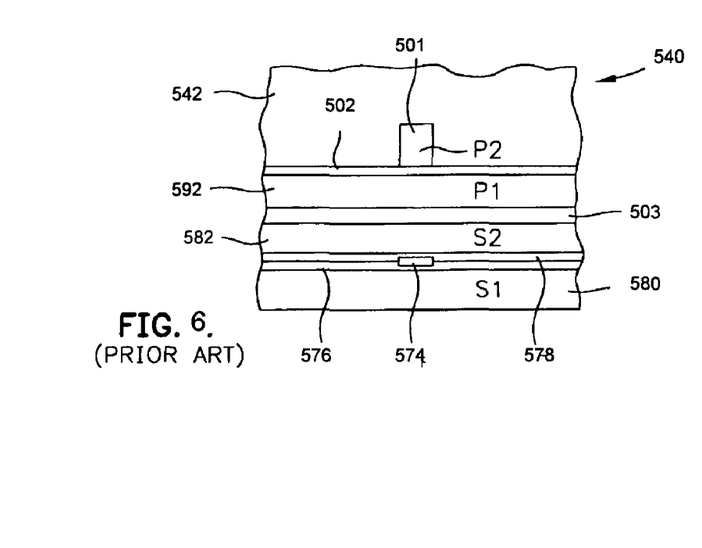
FIG. 6 is an air bearing surface (ABS) view of the magnetic head of FIG. 5.

FIG. 5 is a side cross-sectional elevation view of a magnetic head 540. The magnetic head 540 includes a write head portion 570 and a read head portion 572 disposed on slider 542. The read head portion 572 includes an MR sensor 574. However, those skilled in the art will recognize that the present invention is not meant to be limited to any particular type of MR sensor. FIG. 6 is an ABS view of the magnetic head of FIG. 5. The sensor 574 is sandwiched between first and second gap layers 576 and 578, and the gap layers 576 and 578 are sandwiched between first and second shield layers 580 and 582. In a piggyback head as shown in FIG. 5, the second shield layer (S2) 582 and the first pole piece (P1) 592 are separate layers. The first and second shield layers 580 and 582 protect the MR sensor element 574 from adjacent magnetic fields. More conventionally, the second shield 582 also functions as the first pole (P1) 592 of the write element, giving rise to the term "merged MR head." However, the present invention is not meant to be limited to a particular type of MR head.

In response to external magnetic fields, the resistance of the sensor 574 changes. A sense current $I_s$ conducted through the sensor causes these resistance changes to be manifested as voltage changes. These voltage changes are then processed as readback signals by the signal processing system 350 shown in FIG. 3.

The write head portion of the magnetic head includes a coil layer 584 sandwiched between first and second insulation layers 586 and 588. A third insulation layer 590 may be employed for planarizing the head to eliminate ripples in the second insulation layer caused by the coil layer 584. The first 586, second 588 and third 590 insulation layers are referred to in the art as an "insulation stack." The coil layer 584 and the first, second and third insulation layers 586, 588 and 590 are sandwiched between first and second pole piece layers 592 and 594. The first and second pole piece layers 592 and 594 are magnetically coupled at a back gap 596 and have first and second pole tips 598 and 501 which are separated by a write gap layer 502 at the ABS 548. The first pole piece layer 592 is separated from the second shield layer 582 by an insulation layer 503.

Figure 7:
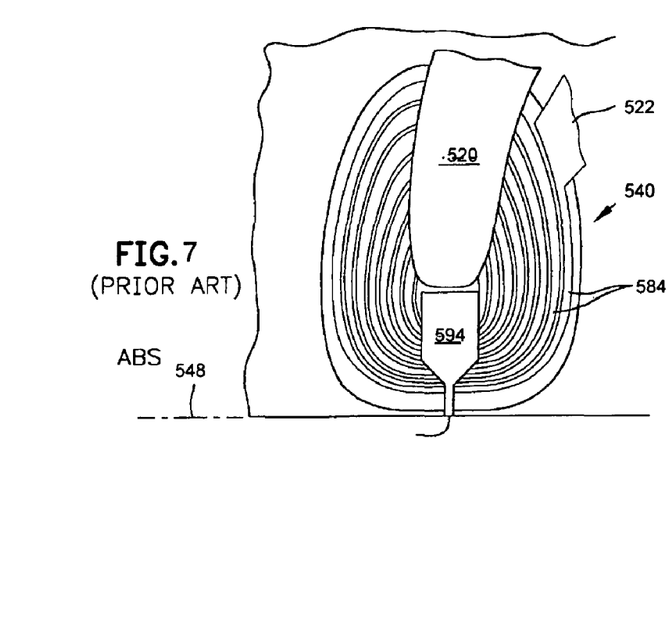
FIG. 7 illustrates the connect leads coupled to the coil for the write pole piece.

FIG. 7 illustrates a view of the connect leads 520, 522 coupled to the coil 584 for the write pole piece 594. As shown in FIGS. 4–7, first and second solder connections 404 and 406 connect leads from the sensor 574 to leads 412 and 414 on the suspension 444, and third and fourth solder connections 416 and 418 connect leads 520 and 522 from the coil 584 (see FIG. 7) to leads 424 and 426 on the suspension.

As described above, as flying heights that are targeted become smaller, it is critical to determine if unintentional contact between the head and disk occurs to maintain reliability of the head/disk interface. The MR sensor is sensitive to temperature changes that occur due to friction during head/disk interaction. In fact, the resistance of the MR sensor is proportional to this temperature change. In accordance with an embodiment of the present invention, by using the MR sensor in the slider, head/disk contact inside the drive may be monitored without added cost or the use of additional equipment.

In addition, seek loss occurs in disk drives when servo is lost and the voice coil motor (VCM) seeks uncontrollably between the inner-diameter (ID) and the outer-diameter (OD) crash stop. Moreover, this seek loss may cause significant disk damage resulting in loss of data or catastrophic mechanical failure of the device. The resistance of the MR sensor may also be used to detect when the slider is on the ramp and therefore the storage device may recover from such events.

Figure 8:
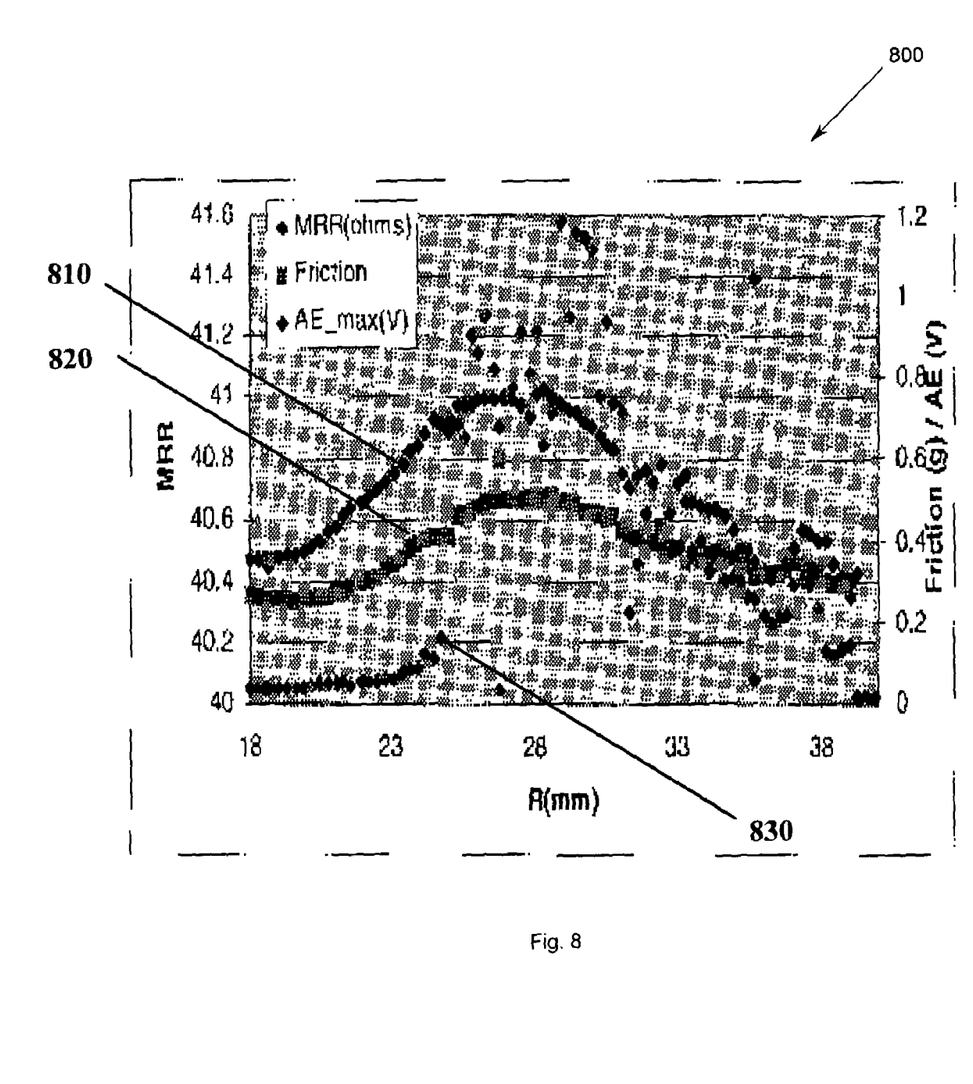
FIG. 8 illustrates the increase in resistance of the MR sensor during contact.

FIG. 8 is a graph 800 illustrating the increase in resistance of the MR sensor during contact. In FIG. 8, a distinct increase in the resistance of the MR sensor 810 is observed during contact. During this period, the friction also observed to increase 820. In fact, the increase for the MR sensor resistance 810 and the friction 820 correlate closely. Also shown in FIG. 8 is a graph of the acoustic emission (AE) measurement 830 during the period when the MR sensor makes contact with the recording medium. As can be seen in FIG. 8, the acoustic emission (AE) 830 increases dramatically as would be expected. The increase in the acoustic emission (AE) 830 is also correlated with the increase in the MR resistance 810. Therefore, FIG. 8 suggests that looking for an increase in the resistance of the MR sensor 810 is a reliable method for detecting contact between the MR head and the recording surface.

Figure 9:
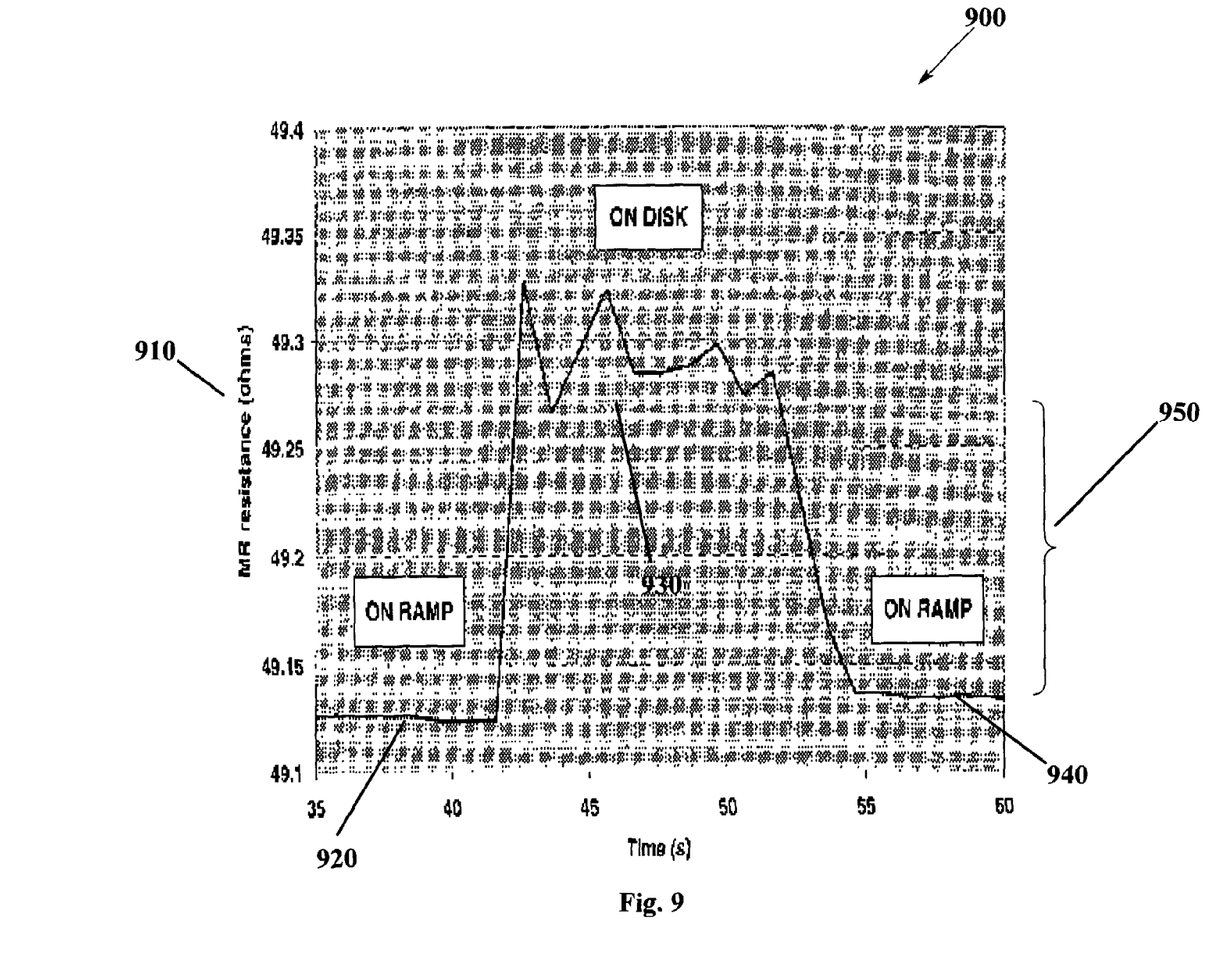
FIG. 9 illustrates the variation in resistance of the MR sensor as the MR head moves from the ramp at the outer diameter to a position over the recording medium and back to the ramp at the outer diameter.

FIG. 9 is a graph 900 illustrating the variation in resistance of the MR sensor 910 as the MR head moves from the ramp at the outer diameter 920 to a position over the recording medium 930 and back to the ramp at the outer diameter 940. Using the same temperature sensitivity as described above with reference to FIG. 8, the MR sensor may be used to determine when the slider is on 920, 940 or off 930 the ramp. Instead of temperature increases due to friction from head/disk contact, the viscous drag of the air flowing over the air-bearing surface causes slight heating of the MR sensor, which translates to an increase in MR resistance. FIG. 9 illustrates that in the particular MR sensor used for this test, there is an MR resistance difference at approximately 0.1 ohms 950 between the slider on the ramp 920, 940 and on the disk 930. When seek loss occurs, using this MR resistance difference, the drive can determine when the MR head is on the ramp 920, 940 and recover from this potentially damaging event.

Figure 10:
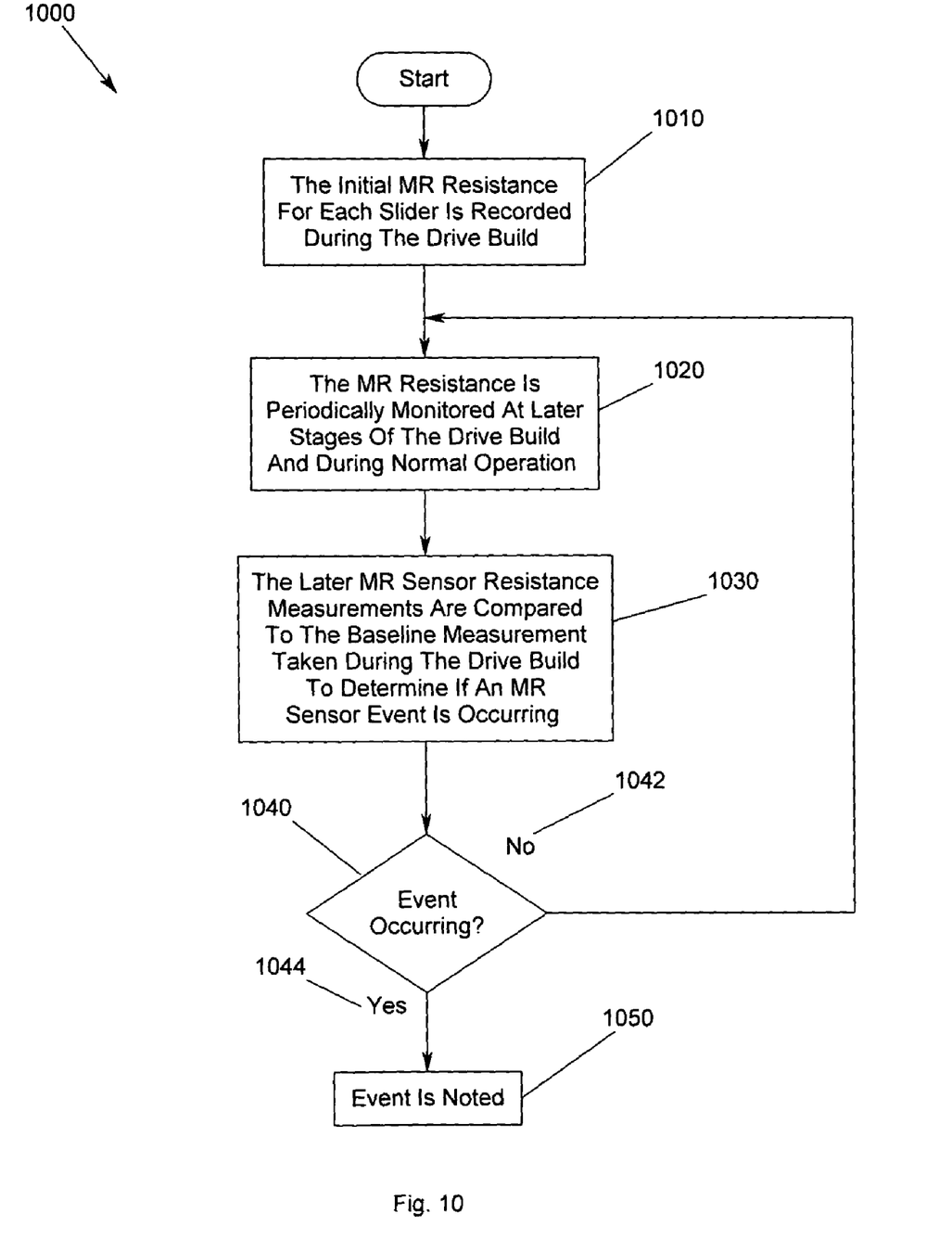
FIG. 10 is a flow chart of the method for sensing increased resistance changes in an MR element to detect MR sensor events according to an embodiment of the present invention.

FIG. 10 is a flow chart 1000 of the method for sensing increased resistance changes in an MR element to detect MR sensor events according to an embodiment of the present invention. The MR sensor may be used as a monitoring tool to determine if individual sliders in a drive are in contact with the disk and/or to determine the sensor location ON/OFF the load/unload ramp during the manufacturing process or normal drive operation. Because the resistance of the MR sensor is proportional to temperature change, monitoring the MR resistance provides feedback about head/disk contact without additional parts or cost. In a drive, the initial MR resistance for each slider is recorded during the drive build 1010. The MR resistance is periodically monitored at later stages of the drive build and during normal operation 1020. The later MR sensor resistance measurements are compared to the baseline measurement taken during the drive build to determine if an MR sensor event is occurring 1030. A determination is made whether an MR sensor event is occurring based upon the comparison 1040. If an MR sensor event is not occurring 1042, e.g., the sensor is not making contact with the recording medium, or the sensor is not over the load/unload ramp, the system may continue to make periodic MR sensor resistance measurements 1020. If a MR sensor event is not occurring 1044, e.g., the sensor is not making contact with the recording medium, or the sensor is not over the load/unload ramp, the MR sensor event is noted 1050. The detection of an MR sensor event 1044 allows corrective action to be taken.

The process illustrated with reference to FIGS. 8–10 may be tangibly embodied in a computer-readable medium or carrier, e.g. one or more of the fixed and/or removable data storage devices 388 illustrated in FIG. 3, or other data storage or data communications devices. The computer program 390 may be loaded into memory 370 to configure the processor 372 for execution of the computer program 390. The computer program 390 include instructions which, when read and executed by a processor 372 of FIG. 3, causes the devices to perform the steps necessary to execute the steps or elements of an embodiment of the present invention.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for sensing MR sensor events, comprising:
taking an initial baseline resistance measurement of an MR element;
making a subsequent resistance measurement of the MR element;
determining whether an MR sensor event occurs based upon the initial and subsequent MR element resistance measurements; and
noting a non-contact event when the determining whether an MR sensor event occurs indicates the MR element being positioned over a ramp.

2. The method of claim 1, wherein the making a subsequent resistance measurement of the MR element further comprises periodically making subsequent resistance measurements.

3. The method of claim 1, wherein the determining whether an MR sensor event occurs further comprises making a comparison of the initial resistance measurement of the MR element and the subsequent resistance measurement of the MR element.

4. The method of claim 1, wherein the making subsequent resistance measurement of the MR element further comprises making subsequent resistance measurements during later stages of a drive build process.

5. The method of claim 1, wherein the making subsequent resistance measurement of the MR element further comprises making subsequent resistance measurements during normal operation after completion of a drive build process.

6. The method of claim 1 further comprising noting a contact event when the determining whether an MR sensor event occurs indicates contact is being made between the MR sensor and a recording medium.

7. The method of claim 6 further comprising taking corrective action when a contact event is detected.

8. The method of claim 1 further comprising taking corrective action when an MR sensor event is detected.

9. A storage device signal processor for detecting contact of an MR sensor with a recording medium, comprising:
memory for storing data; and
a processor, coupled to the memory, for taking an initial baseline resistance measurement of an MR element, making a subsequent resistance measurement of the MR element and determining whether an MR sensor event occurs based upon the initial and subsequent MR element resistance measurements, wherein the MR sensor event comprises the MR element being positioned on a ramp.

10. The storage device signal processor of claim 9, wherein the processor makes subsequent resistance measurement of the MR element periodically.

11. The storage device signal processor of claim 9, wherein the processor determines whether an MR sensor event occurs by performing a comparison of the initial resistance measurement of the MR element and the subsequent resistance measurement of the MR element.

12. The storage device signal processor of claim 9, wherein the processor makes subsequent resistance measurement of the MR element during later stages of a drive build process.

13. The storage device signal processor of claim 9, wherein the processor makes subsequent resistance measurement of the MR element during normal operation after completion of a drive build process.

14. The storage device signal processor of claim 9, wherein the processor notes an MR sensor event when contact is determined to have been made between the MR sensor and a recording medium.

15. The storage device signal processor of claim 14, wherein the processor allows corrective action to be taken when a contact event is detected.

16. The storage device signal processor of claim 9, wherein the processor allows corrective action to be taken when an MR sensor event is detected.

17. A storage device, comprising:
a magnetic recording medium for recording data thereon;
a transducer having an MR element for reading data stored on the magnetic recording medium;
a motor, coupled to the magnetic recording medium, for translating the magnetic recording medium;
an actuator, coupled to the transducer, for translating the transducer relative to the magnetic recording medium; and
a storage device signal processor, coupled to the motor, transducer and actuator, for taking an initial baseline resistance measurement of the MR element, making a subsequent resistance measurement of the MR element and determining whether an MR sensor event occurs based upon the initial and subsequent MR element resistance measurements, wherein the MR sensor event comprises the MR element being positioned on a ramp.

18. The storage device of claim 17, wherein the storage device signal processor makes subsequent resistance measurement of the MR element periodically.

19. The storage device of claim 17, wherein the storage device signal processor determines whether an MR sensor event occurs by performing a comparison of the initial resistance measurement of the MR element and the subsequent resistance measurement of the MR element.

20. The storage device of claim 17, wherein the storage device signal processor makes subsequent resistance measurement of the MR element during later stages of a drive build process.

21. The storage device of claim 17, wherein the storage device signal processor makes subsequent resistance measurement of the MR element during normal operation after completion of a drive build process.

22. The storage device of claim 17, wherein the storage device signal processor notes a contact event when an MR sensor event is determined to have occurred.

23. The storage device of claim 22, wherein the storage device signal processor allows corrective action to be taken when a contact event is detected.

24. The storage device of claim 17, wherein the storage device signal processor allows corrective action to be taken when an MR sensor event is detected.

25. A program storage device readable by a computer, the program storage device tangibly embodying one or more programs of instructions executable by the computer to perform a method for sensing contact of an MR sensor with a recording medium, comprising:

taking an initial baseline resistance measurement of an MR element;

making a subsequent resistance measurement of the MR element;

determining whether an MR sensor event occurs based upon the initial and subsequent MR element resistance measurements; and     noting a non-contact event when the determining whether an MR sensor event occurs indicates the MR element being positioned over a ramp.

* * * * *